E. D ROSENCRANTZ.
Running-Gear.
No. 14,831.                                      Patented May 6, 1856.
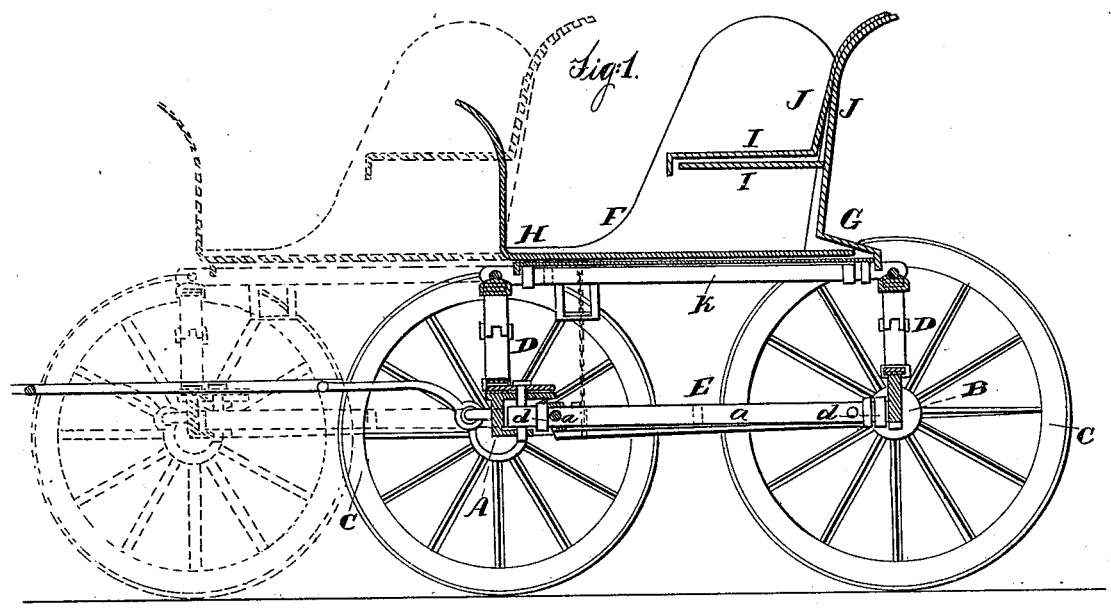
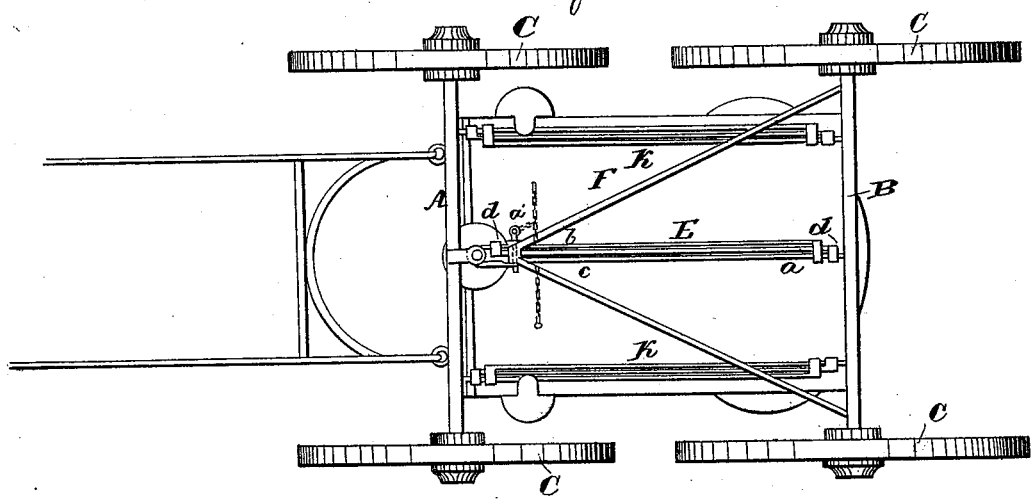

UNITED STATES PATENT OFFICE.

E. D. ROSENCRANTZ, OF NEW YORK, N. Y.

EXTENSION-WAGON.

Specification of Letters Patent No. 14,831, dated May 6, 1856.

*To all whom it may concern:*

Be it known that I, EPHRAIM D. ROSEN-CRANTZ, of the city, county, and State of New York, have invented a new and useful Improvement in Wagons or other Vehicles, which improvement I term an "Extension Wagon or Vehicle;" and I do hereby declare that the following is a full, clear, and exact description of the same, reference being had to the annexed drawings, making a part of this specification, in which—

Figure 1, is a longitudinal vertical section of my improvement, the plane of section being through the center. Fig. 2, is an inverted plan of the same.

Similar letters of reference indicate corresponding parts in the two figures.

The invention consists in so connecting the axles of the front and hind wheels that by the use of slide bars and clasps connecting said axles, they may be extended or contracted in making changes from a single to a double seat vehicle; said bars serving the purpose of a reach or coupling admitting of the employment of the ordinary stay rods or braces required in giving strength to the rear axle, and admitting of the turning of the front wheels under the body without interference. When this improved reach is used in connection with the slide bars supporting the body of the vehicle, they effect an improvement in a simple manner, free from all the disagreeable rattling of other constructions.

To enable those skilled in the art to fully understand and construct my invention, I will proceed to describe it.

A, represents the front and B, the back axle of a wagon or vehicle. C, are the wheels and D, D, are the springs. The above parts are constructed in the usual manner.

E, represents the reach which is formed of three parts (*a*), (*b*), (*c*), the part (*a*), being attached to the back axle B, and the part (*b*), to the front axle, the ends of the part (*c*), being attached to the parts (*a*), (*b*), by collars (*d*), through which the parts (*a*) (*b*), may slide freely. By this construction of the reach E, the front and back axles may be brought nearer together or farther apart as desired.

F, represents the body of the wagon or vehicle, which is formed of two parts G, H. The back part, G, is made a trifle larger than the front part H, so that the front part may be fitted within the back part. Each part of the body is provided with a seat I, and back J, and the seat of the front part of the body is a trifle higher than that of the back part so that the front seat may fit over the back one when the two parts are shoved one within the other the two backs J, being in contact. To the under sides of the parts G, H, there are attached slide bars K, K, constructed similarly to the reach E, as shown in Fig. 2. The parts of the reach E, may when closed or shoved together be connected by a pin (*a'*), or some equivalent device.

By the above improvement it will be seen that when the two parts G, H, of the body F, are shoved together a body or wagon with one seat is obtained, and if two seats are required the two parts G, H, are extended or drawn apart as shown in red Fig. 1, and a two seated wagon or vehicle is obtained. The body may be formed of three parts if desired but the construction will be precisely similar.

The invention is simple not liable to get out of repair and serves the purpose of two different vehicles as far as space or room is considered.

Having thus described my invention, what I claim as new and desire to secure by Letters Patent, is—

The employment of the slide bars *b c a* constructed as described, when used with the bars K K in the manner and for the purposes substantially as set forth.

EPHRAIM D. ROSENCRANTZ.

Witnesses:
WILLARD H. SMITH,
JOHN L. GARDNER.